United States Patent
Albertz et al.

(10) Patent No.: US 12,196,285 B2
(45) Date of Patent: Jan. 14, 2025

(54) BEARING ASSEMBLY FOR SUPPORTING A UNIT OF A MOTOR VEHICLE ON A STRUCTURAL COMPONENT OF THE MOTOR VEHICLE

(71) Applicant: Bayerische Motoren Werke Aktiengesellschaft, Munich (DE)

(72) Inventors: Frank Albertz, Garmisch-Partenkirchen (DE); Peter Genender, Woerthsee (DE); Ulrich Theuersbacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/284,103

(22) PCT Filed: May 25, 2022

(86) PCT No.: PCT/EP2022/064312
§ 371 (c)(1),
(2) Date: Sep. 26, 2023

(87) PCT Pub. No.: WO2022/258390
PCT Pub. Date: Dec. 15, 2022

(65) Prior Publication Data
US 2024/0175478 A1    May 30, 2024

(30) Foreign Application Priority Data
Jun. 10, 2021   (DE) ................ 10 2021 114 994.0

(51) Int. Cl.
*F16F 15/04*   (2006.01)
*B60H 1/32*    (2006.01)

(52) U.S. Cl.
CPC ......... *F16F 15/046* (2013.01); *B60H 1/3229* (2013.01)

(58) Field of Classification Search
CPC .... F16F 15/046; B60H 1/3229; B60H 1/3223
(Continued)

(56) References Cited

U.S. PATENT DOCUMENTS

| 2,086,370 A | 7/1937 | Taub |
| 3,841,426 A | 10/1974 | Nemschoff |

(Continued)

FOREIGN PATENT DOCUMENTS

| CA | 2249311 A1 | 9/1998 |
| DE | 2 358 103 A | 6/1974 |

(Continued)

OTHER PUBLICATIONS

International Search Report (PCT/ISA/210) issued in PCT Application No. PCT/EP2022/064311 dated Oct. 25, 2022 with English translation (4 pages).

(Continued)

*Primary Examiner* — Muhammad Ijaz
(74) *Attorney, Agent, or Firm* — Crowell & Moring LLP

(57) ABSTRACT

A bearing assembly for supporting a unit of a motor vehicle includes at least two first bearings, each of which has a line and an attachment element. Each of the lines is attached to a line attachment point on the unit. The lines are fixed to a structural component of the motor vehicle by means of the attachment elements, and each of the first bearings has a respective bearing rigidity such that forces produced by the rotation of the unit and introduced into the structural component of the vehicle via the first bearings cancel each other out.

13 Claims, 2 Drawing Sheets

(58) Field of Classification Search
USPC .......................................................... 248/560
See application file for complete search history.

(56) References Cited

U.S. PATENT DOCUMENTS

| | | | | |
|---|---|---|---|---|
| 5,839,295 | A * | 11/1998 | Lehmann | F25B 39/022 |
| | | | | 62/295 |
| 9,045,029 | B2 * | 6/2015 | Mair | B60K 7/0007 |
| 10,048,599 | B2 * | 8/2018 | Peijster | H01J 37/3174 |
| 2007/0151819 | A1 * | 7/2007 | Schmidt | F16F 15/046 |
| | | | | 188/371 |
| 2011/0085152 | A1 * | 4/2011 | Nishino | G03F 7/709 |
| | | | | 355/72 |
| 2014/0138171 | A1 * | 5/2014 | Mair | B60L 50/52 |
| | | | | 180/55 |
| 2014/0190189 | A1 * | 7/2014 | Kowsky | B60H 1/00899 |
| | | | | 62/81 |
| 2014/0217664 | A1 * | 8/2014 | Willems | B60G 11/56 |
| | | | | 267/34 |
| 2015/0122452 | A1 * | 5/2015 | Iino | B60H 1/3227 |
| | | | | 165/41 |
| 2015/0122970 | A1 * | 5/2015 | Platus | F16F 3/02 |
| | | | | 267/140.4 |
| 2018/0339716 | A1 * | 11/2018 | Tanaka | B61D 27/0018 |
| 2023/0332607 | A1 * | 10/2023 | Shibata | F04D 29/056 |
| 2024/0175478 | A1 * | 5/2024 | Albertz | B60H 1/3223 |

FOREIGN PATENT DOCUMENTS

| | | |
|---|---|---|
| DE | 200 20 829 U1 | 3/2001 |
| DE | 697 13 579 T2 | 11/2002 |
| DE | 10 2011 080 037 A1 | 1/2013 |
| DE | 10 2018 131 998 A1 | 6/2020 |
| EP | 0 891 886 B1 | 6/2002 |
| JP | 9-123770 A | 5/1997 |
| JP | 9-150635 A | 6/1997 |
| WO | WO 2006/070558 A1 | 7/2006 |

OTHER PUBLICATIONS

German-language Written Opinion (PCT/ISA/237) issued in PCT Application No. PCT/EP2022/064311 dated Oct. 25, 2022 with English translation (8 pages).
German-language Search Report issued in German Application No. 10 2021 114 991.6 dated Mar. 22, 2022 with partial English translation (10 pages).
International Search Report (PCT/ISA/210) issued in PCT Application No. PCT/EP2022/064312 dated Oct. 25, 2022 with English translation (4 pages).
German-language Written Opinion (PCT/ISA/237) issued in PCT Application No. PCT/EP2022/064312 dated Oct. 25, 2022 with English translation (8 pages).
German-language Search Report issued in German Application No. 10 2021 114 994.0 dated Mar. 22, 2022 with partial English translation (10 pages).
Dahl., "Die Kopplungsfreie, Elastische Lagerung von Motoren mit Hilfe von Gummielementen", Dipl.-Ing. M. Dahl, Continental-Gummi-Werke A.G., 1969, pp. 266-271, vol. 8, (6 pages).

* cited by examiner

BEARING ASSEMBLY FOR SUPPORTING A UNIT OF A MOTOR VEHICLE ON A STRUCTURAL COMPONENT OF THE MOTOR VEHICLE

CROSS REFERENCE TO RELATED APPLICATION

This application contains subject matter related to U.S. application Ser. No. 18/284,100, entitled "Bearing Assembly for Supporting a Unit of a Motor Vehicle on a Structural Component of the Motor Vehicle," filed on Sep. 26, 2023.

BACKGROUND AND SUMMARY

The invention relates to a bearing assembly or a unit bearing for supporting a unit of a motor vehicle on a structural component of the motor vehicle.

Bearing assemblies for supporting a unit of a motor vehicle on a structural component of the motor vehicle are known in various embodiments from the prior art.

DE 10 2018 131 998 A1 describes a unit fastening device for fixing units to a vehicle body in an oscillatory manner. The unit fastening device comprises a first bearing part, a second bearing part and an elastic, oscillation-damping element. By means of the elastic, oscillation-damping element, forces which are introduced into the vehicle body by way of the unit fastening device are reduced. Here, the softer or more elastically deformable the design of the oscillation-damping element is, the better a damping action of the oscillation-damping element.

Fixing apparatuses for the fixing of lines, via which fluids are fed to the unit or discharged therefrom, are also known from the prior art.

DE 200 20 829 U1 describes a unit carrier for supporting a unit, said unit carrier comprising receptacles for a line of a unit. In order to fix the lines to the unit carrier, the lines are pushed against the unit carrier in each case by means of a fixing element.

Both in the case of the known bearing assemblies for supporting a unit on a structural component of a motor vehicle and in the case of the known fixing apparatuses for fixing a line to a structural component of a motor vehicle, forces which are caused by rotational movement of the unit are introduced into the structural component of the motor vehicle by way of the bearing assemblies or the fixing apparatuses. These forces cause oscillations in the structural component. The oscillations of the structural component in turn result in poor acoustics characteristics of the structural component or disturbing noises.

Proceeding from DE 200 20 829 U1, it is the object of the present invention to provide a bearing assembly which securely supports or fixes a unit and lines for feeding and discharging fluids and which simultaneously optimizes or minimizes impacts of a rotational movement of the unit on the acoustics characteristics of the structural component of the motor vehicle.

This object is achieved by means of the bearing assembly having the features of the independent claims.

According to the invention, a bearing assembly for supporting a unit of a motor vehicle, in particular an electric refrigerant compressor or air-conditioning compressor, on a structural component of the motor vehicle is thus provided, said bearing assembly comprising at least two first bearings. The first bearings each have a line or a hose and a rigid attachment element. The lines each comprise, at one end, a line attachment point at which the lines are attached to the unit or are connected to the unit. The attachment elements fix the lines to the structural component of the motor vehicle. The first bearings each have such a bearing stiffness that forces which are caused by rotation of the unit and which are introduced into the structural component of the vehicle by way of the first bearings cancel one another out.

In the case of the bearing assembly according to the invention, the lines for feeding and discharging a fluid are thus themselves a constituent part of the bearing assembly supporting the unit. There is thus no need for an additional fixing apparatus in order to fix the lines to the structural component of the motor vehicle. In this way, a number of regions in which forces caused by the rotation of the unit are introduced into the structural component of the motor vehicle is reduced.

Furthermore, the forces introduced into the structural component at least largely cancel one another out by virtue of the fact that the first bearings are designed in such a way that they have a bearing stiffness which acts symmetrically with respect to a center of gravity of the unit.

Consequently, the unit and the lines can be securely supported on or fixed to the structural component by means of the bearing assembly according to the invention, wherein, at the same time, impacts of a rotational movement of the unit on the structural component of the motor vehicle are minimized and thus the acoustics characteristics of the structural component are optimized.

In a preferred embodiment of the bearing assembly according to the invention, the first bearings have a bearing stiffness which acts symmetrically with respect to a center of gravity, in particular a center of mass or mass center point, of the unit.

In an exemplary embodiment of the bearing assembly according to the invention, the first bearings have a rotational stiffness about an axis of rotation extending in the direction of the center of gravity of the unit, said rotational stiffness acting symmetrically with respect to the center of gravity of the unit.

The stiffness of the first bearings is defined, for example, by the material stiffness and the geometry of the attachment element and the material stiffness and the geometry of the line.

In a preferred embodiment of the bearing assembly according to the invention, the lines are molded hoses, that is to say the lines are preformed in such a way that they have a bent or curved profile or subregion.

The lines for example comprise a U-shaped subregion.

In an exemplary embodiment of the bearing assembly according to the invention, the lines each have such a stiffness, in particular bending stiffness and torsional stiffness, that oscillations of the structural component that result from forces which are caused by rotational movement of the unit and which are introduced into the structural component of the vehicle by way of the bearings cancel one another out. This further reduces the impacts of a rotational movement of the unit on the acoustics characteristics of the structural component of the motor vehicle.

The line attachment points may be arranged symmetrically with respect to one another in relation to the center of gravity of the unit, that is to say may have the same spacing to the unit. In this way, two identical first bearings can be used.

In a preferred embodiment, the bearing assembly according to the invention comprises two second bearings. The center points of the line attachment points of the two first bearings and elastic centers or centers of area of the two second bearings span a planar or two-dimensional area in which the center of gravity of the unit is arranged.

The term "elastic center" should be understood in the context of the present invention to mean that point of a body at which the elastic bearing axes of the body at least approximately intersect.

The spanned two-dimensional area may comprise at least two axes of symmetry. The two axes of symmetry may run orthogonally with respect one another and may intersect at the center of gravity of the unit. The first bearings and the second bearings may each be configured symmetrically with respect to one another and may each have the same bearing stiffness. In this way, only two types of bearings are required, namely a type of first bearing and a type of second bearing.

The spanned two-dimensional area is, for example, a rectangle, a square or a rhombus.

The second bearings may be sleeve bearings.

In a preferred embodiment of the bearing assembly according to the invention, the attachment elements of the first bearings can be attached to the same structural component of the motor vehicle. In particular, the attachment elements of the first bearings can be attached to the same subregion of the structural component of the motor vehicle. In this way, an acoustic transfer function or structural component sensitivity at the attachment points of the bearing points on the structural components is the same or at least similar, as a result of which a compensation effect of the oscillations of the structural component is ensured.

The second bearings may also be able to be attached to the same structural component of the motor vehicle, in particular to the same subregion of said structural component. The structural component sensitivity of the attachment points of the second bearings on the structural component is thus the same. This ensures the compensation effect of the oscillations of the structural component.

In an exemplary embodiment of the bearing assembly according to the invention, the first bearings and the second bearings can be attached to the same stiff structural component of the motor vehicle. This further increases the oscillation compensation effect.

The attachment elements of the first bearings and/or the second bearings may be attached to the structural component of the motor vehicle by way of a rigid carrier structure. It is thus possible to adapt the bearing assembly to installation space conditions in a simple manner.

The carrier structure may have a stiffness which corresponds to the structural components.

The structural component of the motor vehicle may be a longitudinal member. The longitudinal member may have a hollow profile. The longitudinal member may also have an O-shaped, rectangular or U-shaped profile.

The line may comprise an elastomer. The line is thus elastically deformable, as a result of which the geometry of the line can be reversibly changed and the stiffness of the first bearing in question can be adapted or changed by changing the geometry of the line.

The line may also be a fiber-plastics composite, that is to say may comprise reinforcing fibers and a plastics matrix. The plastics matrix surrounds the fibers which are bonded to the plastics matrix by adhesive interactions. As a result of the reinforcing fibers, the lines have a high dynamic load capacity and are additionally resistant to aging and corrosion.

The invention will be explained in more detail below on the basis of an exemplary embodiment illustrated in the drawings.

DETAILED DESCRIPTION OF THE DRAWINGS

Figure 1:
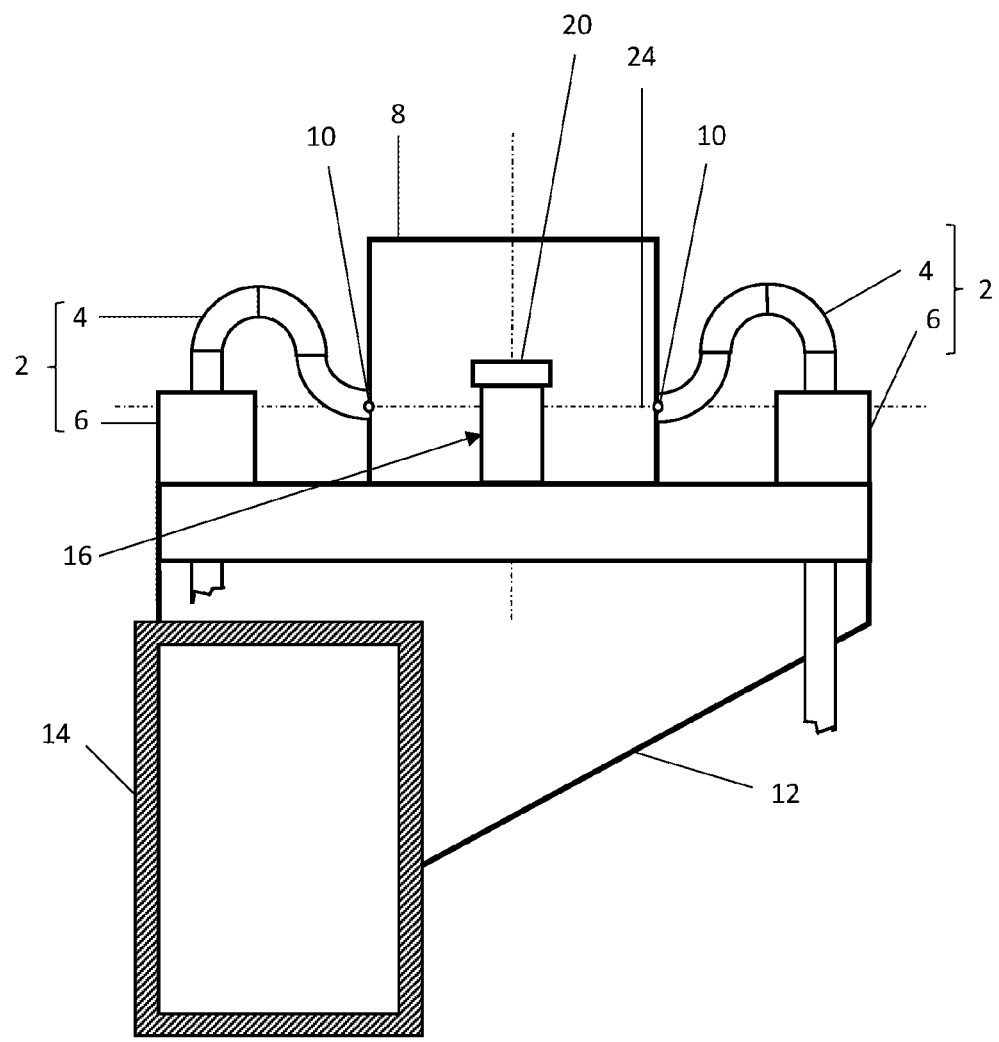
FIG. 1 is a schematic front view of a bearing assembly according to an embodiment of the invention, which supports a unit of a motor vehicle on a longitudinal member of the motor vehicle.

FIG. 1 illustrates a bearing assembly which supports a unit 8 on a rigid longitudinal member 14 of a motor vehicle. The bearing assembly comprises two first bearings 2. The two first bearings 2 each have a line 4 and a rigid attachment element 6.

The unit 8 is an electric refrigerant compressor or an air-conditioning compressor.

The rigid attachment elements 6 each fix a respective one of the lines 4 to a rigid carrier structure 12, which is in turn fixed to the rigid longitudinal member 14. The rigid longitudinal member 14 has a rectangular hollow profile. It is also contemplated for the longitudinal member 14 to have a U profile.

The lines 4 consist of fiber-reinforced elastomer with a defined stiffness. As a result of geometrical deformation or the geometrical arrangement of the lines 4, the stiffness of the first bearings 2 is increased. In this regard, the lines 4 are bent in such a way that they have a semicircular or U-shaped subregion. The lines 4 have the same geometrical configuration, in particular bending, and are produced from the same material. The lines are thus of equal stiffness.

The lines 4 are each connected to the unit 8 at a line attachment point 10 in such a way that they can supply a fluid to the unit 8 and can discharge a fluid from the unit 8. The line attachment points 10 are arranged symmetrically relative to a center of gravity of the unit 8. Due to such a symmetrical arrangement and due to the fact that the first bearings 2 have the same stiffness, oscillations caused by forces which are produced by rotational movement of the unit 8 and which are introduced into the carrier structure 12 by way of the two first bearings 2 interfere with one another in such a way that the oscillations of the carrier structure 12 cancel out or balance out. The production of vibrations or disturbing noises is thus prevented or at least minimized.

Figure 2:
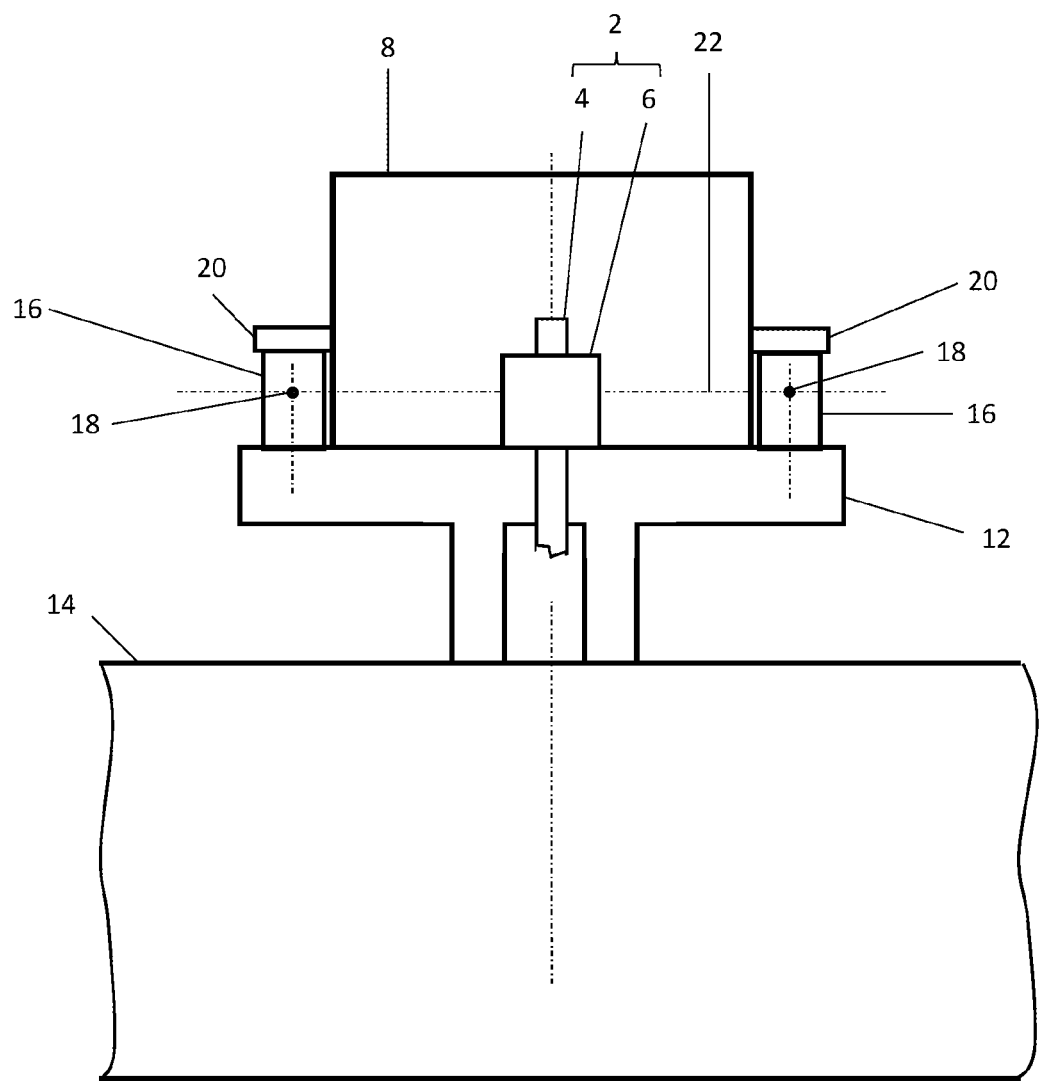
FIG. 2 is a schematic side view of the bearing assembly illustrated in FIG. 1.

As is apparent from FIG. 2, the bearing assembly also comprises two second bearings 16. The second bearings 16 are sleeve bearings. The second bearings 16 are each connected to the unit 8 by way of a projection 20 or a support element of the unit 8.

The two second bearings 16 each have an elastic center 18. The second bearings 16 are arranged on the carrier structure 12 in such a way that the elastic center 18 of the two second bearings 16 together with a center point of the line attachment points 10 of the two first bearings 2 span a two-dimensional planar area in which the center of gravity of the unit 8 is arranged when the unit 8 is supported on the longitudinal member 14 by means of the bearing assembly.

The spanned two-dimensional area comprises a first axis of symmetry 22 illustrated in FIG. 2 and a second axis of symmetry 24 (see FIG. 1). The first axis of symmetry 22 and the second axis of symmetry 24 run orthogonally with respect to one another and intersect at the center of gravity of the unit 8. The spanned two-dimensional area is a rectangle.

The first bearings 2 are of axially symmetrical or mirror-symmetrical configuration in relation to the first axis of symmetry 22. The second bearings 16, are axially symmetrical with respect to the second axis of symmetry 24. Like the first bearings 2, the second bearings 16 also have the same stiffness.

Due to the symmetrical arrangement of the first bearings 2 and of the second bearings 16 and due to the fact that the first bearings 2 and the second bearings 16 are respectively of equal stiffness, the oscillations of the longitudinal member 14 which are caused by the forces introduced into the longitudinal member 14 by way of the first bearings 2, and the oscillations of the longitudinal member 14 which result from the forces introduced into the longitudinal member 14 by the second bearings 16, in each case interfere with one another in such a way that the oscillations cancel or balance one another out. The second bearings 16 thus also prevent or minimize the production of disturbing noises and simultaneously increase a load-bearing capacity and security of the bearing assembly.

LIST OF REFERENCE DESIGNATIONS

2 First bearing
4 Line
6 Attachment element
8 Unit
10 Line attachment point
12 Carrier structure
14 Longitudinal member
16 Second bearing
18 Elastic center
20 Projection of the unit
22 First axis of symmetry
24 Second axis of symmetry

The invention claimed is:

1. A bearing assembly for supporting a unit of a motor vehicle on a structural component of the motor vehicle, comprising:
   two first bearings, wherein
   the two first bearings each comprise a line and a rigid attachment element,
   each line is attached at one end to the unit at a line attachment point and is directly attached at the other end to the rigid attachment element for fixation to the structural component of the motor vehicle,
   the two first bearings each have a bearing stiffness which acts symmetrically with respect to a center of gravity of the unit such that forces which are caused by rotation of the unit and which are introduced into the structural component of the vehicle by way of the two first bearings cancel out one another, so as to reduce vibrational acoustics,
   wherein the stiffness of the two first bearings is defined by a material stiffness of the attachment element, a geometry of the attachment element, a material stiffness of the line, and a geometry of the line.

2. The bearing assembly according to claim 1, wherein the two first bearings have a rotational stiffness about an axis of rotation extending in the direction of the center of gravity of the unit, said rotational stiffness acting symmetrically with respect to the center of gravity of the unit.

3. The bearing assembly according to claim 1, wherein the lines each have a stiffness such that forces which are introduced into the structural component of the vehicle by the unit via the line and the attachment elements and which are caused by a rotational movement of the unit cancel out one another.

4. The bearing assembly according to claim 1, wherein the line attachment points are arranged symmetrically with respect to one another in relation to a center of gravity of the unit.

5. The bearing assembly according to claim 1, further comprising:
   two second bearings, wherein
   center points of the line attachment points of the two first bearings and an elastic center of the two second bearings span a two-dimensional area in which a center of gravity of the unit is arranged.

6. The bearing assembly according to claim 5, wherein the spanned two-dimensional area comprises at least two axes of symmetry which run orthogonally with respect one another and which intersect at the center of gravity of the unit, and
   the two first bearings and the two second bearings are each symmetrical to one another and have the same bearing stiffness.

7. The bearing assembly according to claim 5, wherein the spanned two-dimensional area is a rectangle, a square, a rhombus or a polygon with an even number of corners.

8. The bearing assembly according to claim 5, wherein the two first bearings and/or the two second bearings are attachable to the same stiff structural component of the motor vehicle.

9. The bearing assembly according to claim 5, wherein the two first bearings and/or the two second bearings are attachable to the structural component of the motor vehicle by way of a carrier structure.

10. The bearing assembly according to claim 5, wherein the two second bearings are sleeve bearings.

11. The bearing assembly according to claim 1, wherein the two first bearings are attachable to the same stiff structural component of the motor vehicle.

12. The bearing assembly according to claim 1, wherein the two first bearings are attachable to the structural component of the motor vehicle by way of a carrier structure.

13. A bearing assembly for supporting a unit of a motor vehicle on a structural component of the motor vehicle, comprising:
   two first bearings, wherein
   the two first bearings each comprise a line and a rigid attachment element,
   each line is attached at one end to the unit at a line attachment point and is directly attached at the other end to the rigid attachment element for fixation to the structural component of the motor vehicle,
   the two first bearings each have a bearing stiffness which acts symmetrically with respect to a center of gravity of the unit such that forces which are caused by rotation of the unit and which are introduced into the structural component of the vehicle by way of the two first bearings cancel out one another, so as to reduce vibrational acoustics,
   wherein the stiffness of the two first bearings is defined by a symmetrical material stiffness of the attachment elements, a symmetrical geometry of the attachment elements, a symmetrical material stiffness of the lines, and a symmetrical geometry of the lines.

* * * * *